June 26, 1962 G. A. ECKLES ET AL 3,040,563
MOMENT OF INERTIA AND BALANCING APPARATUS
Filed Jan. 27, 1958 2 Sheets-Sheet 1

Inventors
Geoffrey A. Eckles
Richard M. Elliott
Wilbur H. Farley
Hans F. Schaefer, Jr.
By their Attorney June 26, 1962 G. A. ECKLES ET AL 3,040,563
MOMENT OF INERTIA AND BALANCING APPARATUS
Filed Jan. 27, 1958 2 Sheets-Sheet 2
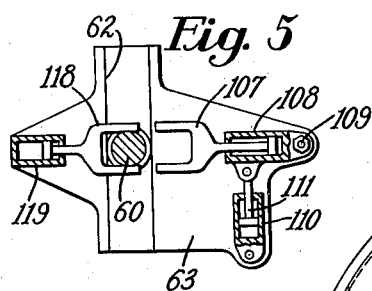
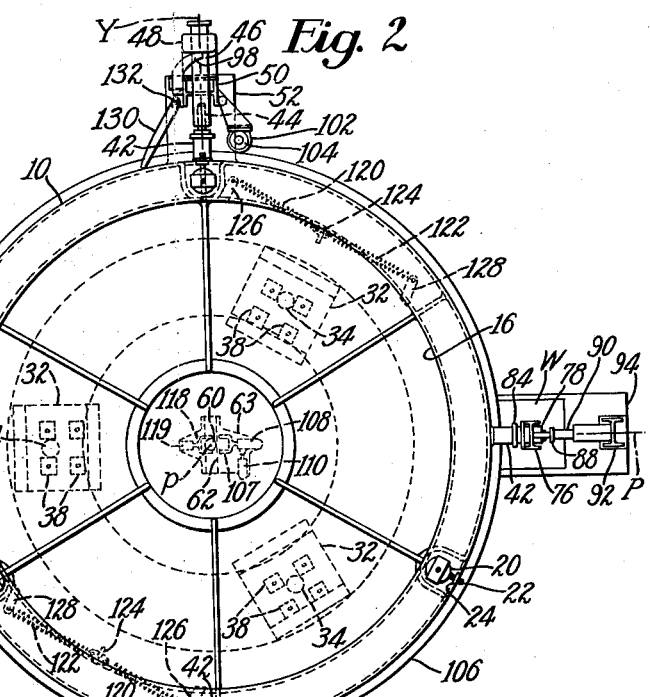
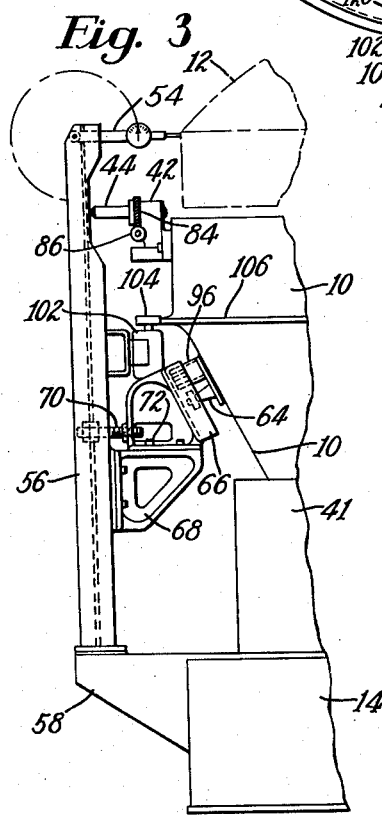
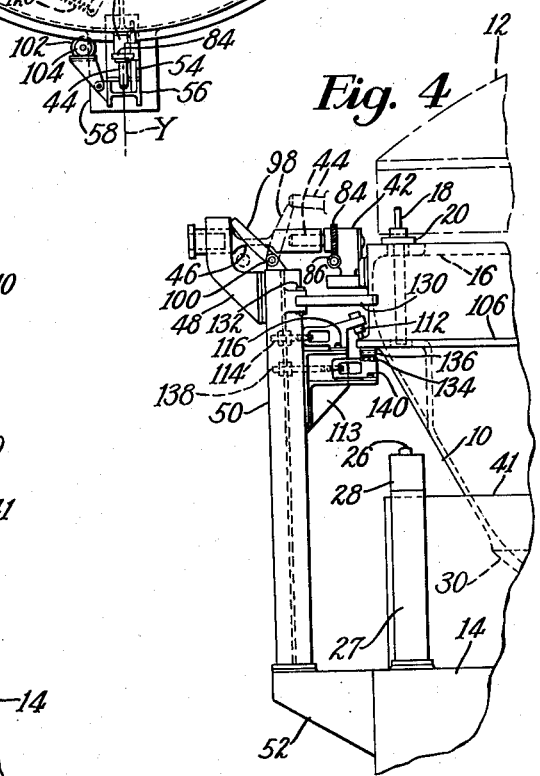

United States Patent Office 3,040,563
Patented June 26, 1962

3,040,563
MOMENT OF INERTIA AND BALANCING APPARATUS
Geoffrey A. Eckles, Hamilton, Richard M. Elliott and Wilbur H. Farley, Beverly, and Hans F. Schaefer, Jr., Rockport, Mass., assignors to United Shoe Machinery Corporation, Flemington, N.J., a corporation of New Jersey
Filed Jan. 27, 1958, Ser. No. 711,268
21 Claims. (Cl. 73—65)

This invention relates to the testing of a body for such characteristics as its moment of inertia, the position of its center of gravity and its dynamic unbalance.

Among the requisites to be satisfied by the invention is the determination of the above characteristics of a body of considerable bulk and weight, with extreme accuracy, by a simple procedure and with a minimum of handling of the body. The type of body with which applicants are concerned is a ballistic missile having a diameter in the order of 60 inches and a weight in the order of 4,000 pounds. The path of such a body in free flight may be affected by its above-mentioned characteristics and, if they are known, the departure of the body from its theoretical trajectory can be accurately predicted.

The invention contemplates novel methods of and apparatus for determining the above-mentioned characteristics of a body from different periods of oscillation, which are measurable with a high degree of accuracy, and from computations by which factors causing or tending to cause a deviation in an observed period are eliminated or rendered negligible.

These factors, such as the amplitude of oscillation and damping caused by bearing friction, which are difficult to determine and affect the accuracy of the result, are removed altogether from the procedure, in one instance, by evaluating the desired property from a simultaneous algebraic solution for it, in which solution the above-mentioned factors are eliminated by cancellation.

All the above-mentioned characteristics of the body are determined with one handling of the body onto and off a carrier therefor which is so mounted as to permit oscillation of the body and carrier, selectively, about any of three mutually perpendicular axes with reference to which the moments of inertia of the body are determined, or to permit the rotation of the body and carrier about one axis and, simultaneously therewith, their oscillation about another axis in response to the dynamic unbalance of the rotating body.

The invention, in a further aspect, contemplates obtaining the above-mentioned different periods of oscillation by effecting predetermined changes in the weight distribution of the carrier. In one instance, the weight distribution of the carrier is varied by shifting weight transversely of the axis of oscillation. To this end, although the same weight could be disposed at different distances from the axis of oscillation, preferably, and as herein illustrated, weight is added to or removed from the carrier at a definite location whereby the moment of inertia and the period of oscillation of the oscillating mass is varied without altering its restoring moment. In this instance, the carrier is oscillated about a vertical axis subject to a predetermined restoring moment obtained by biasing the carrier in opposite directions about the axis.

In the second instance, different periods of oscillation of the oscillating mass are procured by a change in weight distribution effected by varying the disposition of the weight of the carrier with respect only to the effect of gravity, whereby the restoring moment of the oscillating mass is altered without changing its moment of inertia. In the latter instance, weight is shifted upon the carrier in orientation about the axis of oscillation between positions equidistant from, and at opposite sides of, the axis of oscillation. In this instance, the carrier is oscillated about a horizontal axis subject to different gravitational restoring moments.

By such controlled variation of the period of oscillation of the oscillating mass, it is possible to investigate not only the moments of inertia of a body in respect to a vertical axis and each of two perpendicular horizontal axes, but also to ascertain its dynamic unbalance, all with one setting of the body upon the carrier.

Invention is also to be recognized in various features of the illustrated mounting for the carrier by which any of its above-mentioned movements are permitted, together with means for confining movement of the carrier to any desired one, or combination, of its possible movements. More specifically, the carrier, as illustrated herein, has a segmental spherical bearing surface supported by a base comprising spherical bearings engaged by the carrier, the bearings and bearing surface being below both the center of gravity of the carrier and the center of gravity of the carrier and body combined but having their common center of curvature above the above-mentioned centers of gravity for the purpose of rendering the carrier alone, or with the body mounted thereon, stable upon the bearings. The control of the movement of the carrier is effected by guiding means connecting the carrier and base which are selectively engageable with each other to restrain the movement of the carrier in any desired manner as referred to above.

The above and other objects and features of the invention will now be further described in detail, with reference to the accompanying drawings, and will be set forth in the claims.

In the drawings,

FIG. 2 is a plan view of the structure shown in FIG. 1;

FIG. 3 is a side elevation of a forward portion of the apparatus as viewed from the right;

FIG. 4 is a side elevation of a rearward portion of the apparatus as viewed from the left; and FIG. 5 is a sectional plan view of a portion of the means for controlling and guiding the carrier, the section being taken along the line V—V in FIG. 1.

Figure 1:
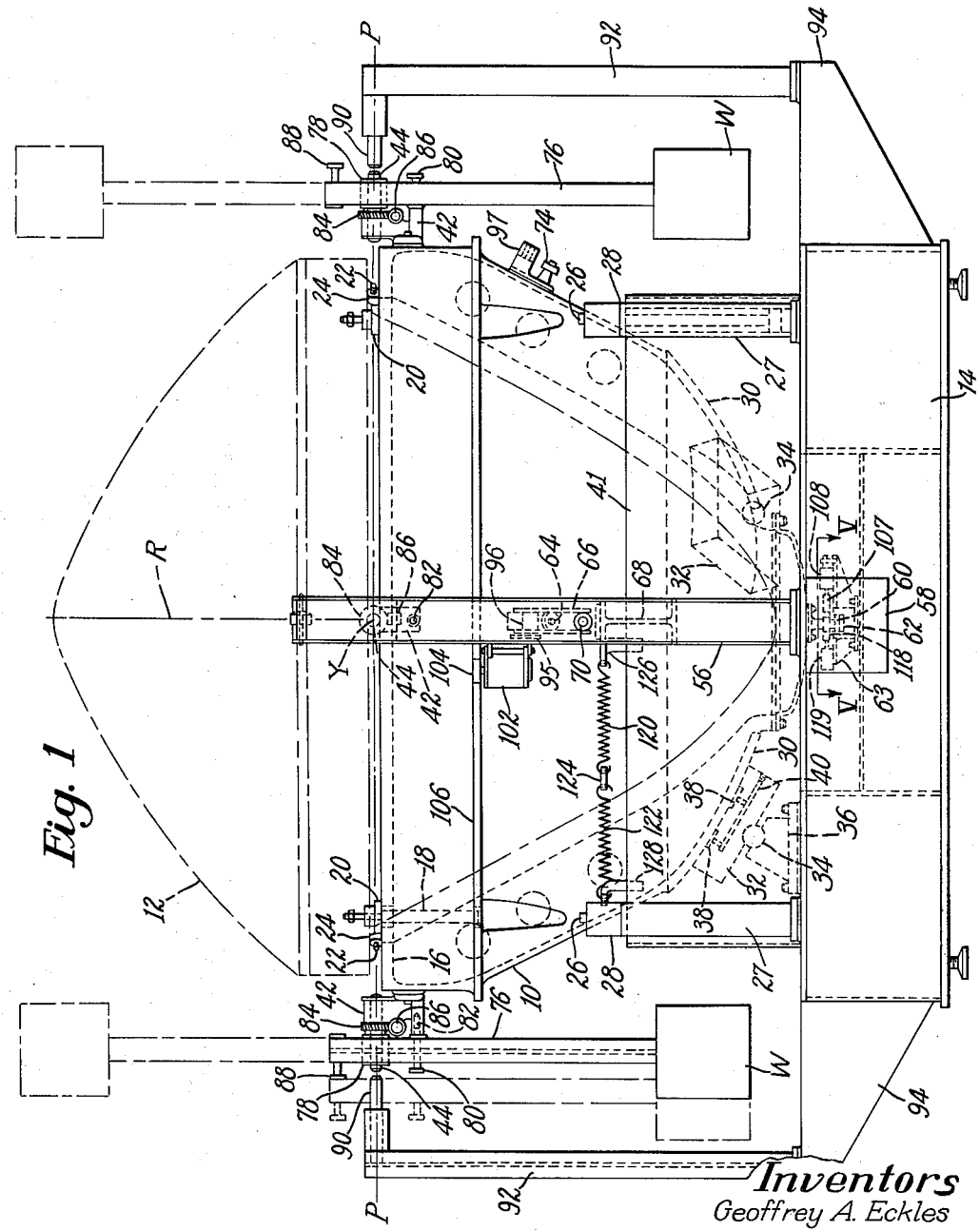
FIG. 1 is a front elevation of apparatus embodying the invention and suitable for use in practicing the methods provided by the invention.

The illustrated apparatus comprises a carrier 10 for holding a body 12 (shown in dot and dash lines) to be tested, the carrier being mounted upon a base 14 for rotative movement in any direction about a point $p$ at the common intersection of a vertical axis R, corresponding to the roll axis of the body 12, and horizontal axes P and Y which are perpendicular to each other and to the axis R, the axes P and Y corresponding to pitch and yaw axes of the body, respectively.

The carrier 10 has at its upper rim a narrow flange 16, upon which the body 12 is supported, and is shaped in the form of a deep bowl suitable for receiving a body such as a nose cone for a missile. The body 12 is provided with three recesses arranged to receive the upper ends of studs 18 having shoulders 20 which rest upon the top of the flange 16. The studs may be fixed to the body by being threaded into it or by means of nuts threaded on the studs and adapted to be set up against internal shoulders formed on the body. The studs extend through clearance holes in the carrier, permitting limited lateral movement of the body upon the carrier for purposes of bringing the center of gravity of the body directly over the point $p$, whereby the carrier with the body thereon is brought into static balance, as will be described below. The body is adjusted and clamped upon the carrier by three set screws 22 which are threaded into lugs 24 fixed to and equally spaced angularly about the flange 16, the screws being arranged to bear against the shoulders 20 on the studs 18. The bottom ends of the studs 18 are accessible to and in alinement with piston rods 26 of three hydraulic jacks 27 which are mounted upon the base 14, the jacks being equipped with a fluid pressure system for elevating the piston rods 26 whereby the weight of the body is removed from the flange 16 and transferred to the jacks. By means of well-known instrumentation, including a strain gage 28 for each jack for measuring its load when the body is raised off the flange 16, the total weight of the body can readily be determined.

Upon the bottom of the carrier 10 there is formed a segmental, spherical bearing surface 30 which is concentric with the point $p$ and which is engaged by three bearings 32 having spherical surfaces shaped to fit the bearing surface 30. Each bearing freely pivots upon a ball 34 which is seated upon a block 36 fixed upon the base 14, the blocks being spaced 120° apart from each other and equidistant from the axis R. Each bearing 32 has four recesses 38 to which oil is supplied from a fluid pressure system through ducts 40 so as to provide a constant film of oil between the bearings 32 and the bearing surface 30, and to render movement of the carrier upon the base substantially frictionless. A shield 41 encircling and joined to the top of the base 14 confines thereto the oil which is emitted from the bearings.

The arrangement and curvature of the bearing surface 30 and bearings 32 is such as to bring the point $p$ to a level above the center of gravity of both the carrier 10 alone and that of the carrier with the body 12 mounted thereon, so that the carrier with or without the body will be in a state of stable equilibrium upon the bearings and that the period of oscillation of the carrier under various conditions of usage, to be referred to later, will be in the order of 2–5 seconds.

Fixed upon the top portion of the carrier are two pairs of weight supporting brackets 42, each bracket having a shaft 44 rotatably mounted therein. One pair of brackets is so located that the axes of their shafts are normally coincident with the axis P and, similarly, the axes of the shafts of the other pair of brackets are normally coincident with the axis Y. To facilitate putting the carrier 10 with the body 12 thereon into static balance, instrumentation, including a force pick-up 46 (FIGS. 2 and 4) engageable with the shaft 44 of the bracket 42 at the rear of the carrier is employed. The pick-up is bored to receive the shaft 44 and is mounted to slide onto the shaft in a bracket 48 which is fixed upon the upper end of a standard 50, the latter being mounted upon a wing 52 projecting rearwardly from the base 14.

The carrier already having been put into balance, if the center of gravity of the body and carrier is not directly under the point $p$, the force necessary to hold the carrier and body level will be exerted by the pic-up 46 and registered by the instrumentation associated therewith. By adjustment of the screws 22, the body may be positioned upon the carrier until no force is exerted by the pick-up. Upon turning the carrier to present an adjacent weight bracket to the pick-up, and repeating the adjustment of the body upon the carrier, the static balancing of the body and carrier is completed.

The location of the center of gravity of the body in a plane parallel to that of the axes P and Y is determined by the use of a dial gage 54 (FIG. 3) which is mounted to swing, into engagement with the periphery of the body 12, upon a standard 56, the latter being mounted upon a wing 58 projecting forwardly from the front of the base 14. Upon rotating the carrier and body and noting the deflection indicated by the gage, the phase and eccentricity of the geometrical axis of the body with respect to its center of gravity can readily be ascertained.

Through the use of various restraints or controls, movement of the carrier may be limited to any of the following: rotation about the axis R; oscillation about the axis P without rotation about the axis R; and simultaneous oscillation of the carrier about the axis P and rotation about the axis R. By appropriate selection and use of these movements of the carrier, in accordance with procedures provided by the present invention as will be pointed out below, there may be determined the moment of inertia of the body about each of the axes R, P and Y, the heightwise position of the center of gravity of the body and the dynamic unbalance of the body, all with one handling of the body onto and off the carrier, the latter consideration being a material one because of the relatively great bulk and weight of the body.

In determining the moment of inertia of the body about the axis P, the movement of the carrier is limited only to that of oscillation about this axis, subject to a gravitational restoring moment, and restraints for thus controlling the movement of the carrier will next be described.

Fixed upon the bottom of the carrier co-axially thereof is a guide 60 (FIGS. 1, 2 and 5) which is received freely within a channel-shaped guideway 62, formed in a member 63, secured upon the base 14 in such a position that the axis of the guide 60 may move only in a plane perpendicular to the axis P. Rotation of the carrier 10 about its axis R is prevented by means comprising a guide 64 (FIGS. 1 and 3) which is fixed upon the carrier and is received in a channel-shaped guideway 66, the latter being, in effect, a continuation of the above-mentioned guideway 62. That is, the center lines of these guideways lie in a common plane perpendicular to the axis P at the point $p$. The guideway 66 is mounted for adjustment into and out of operative relation to the guide 64 upon a bracket 68 which is fixed upon the standard 56; and by turning an adjusting screw 70, which is threaded into the base of the guideway 66, the latter may be retracted out of the path of the guide 64, for purposes which will appear later. Screws 72 passing thorugh elongated slots in the base of the guideway 66 and threaded into the bracket 68 are provided for securing the guideway in its operative position upon the bracket.

To permit the carrier 10 to be oscillated about the axis Y, there is provided on the carrier another guide 74, like the guide 64 but spaced 90° therefrom about the axis R. It will not be apparent that the carrier may be turned through 90° to bring the guide 74 into operative relation to the guideway 66, and that the axis Y of the carrier will then have been brought into the position formerly occupied by the axis P. Accordingly, the body 12 may be oscillated about either of the axes corresponding to the axes P and Y by the appropriate use of the guides 64, 74 without requiring the body 12 to be re-positioned upon the carrier.

With the above-described usage of the apparatus, in determining the moments of inertia of the body about the axes P and Y, the carrier has mounted thereon at opposite sides thereof a pair of weights W, W each of which is positioned in either of two positions 180° apart from each other, directly above and below each other. Each weight is fixed upon an I-beam 76, upon which is fixed a splined bushing 78 adapted to receive any one of the four shafts 44, each shaft having a key (not shown) therein which, cooperating with the bushing, prevents rotation of the weight relatively to the shaft. Each weight W is located and locked in its lower position by a pin 80 mounted in the I-beam 76 to slide transversely thereof into a hole 82 in the bracket 42.

As each weight W weighs in the order of 100 lbs., provision is made for moving the weight between its lower and upper position. To this end, there is fixed upon each shaft 44 a worm gear 84 with which there meshes a worm 86 which is rotatably mounted in the bracket 42.

Upon moving the weight to its upper position, by turning the worm 86, the weight may be located and locked in this position by inserting another pin 88, slidably mounted upon the beam 76 into the bracket 42. During any usage of the apparatus in which the weights W are not required, the weights are stored upon shafts 90 which are mounted, at opposite sides of the base in alinement with the axis P and contiguous to the shafts 44 on this axis, upon standards 92, 92, which are fixed upon wings 94, 94 integral with the base 14.

In any usage of the illustrated apparatus in which the carrier 10 is oscillated about the axis P, the period of oscillation is ascertained with the help of instrumentation including pickup members 95, 96, the former being fixed upon a side of the channel 66, and the latter being associated with the guide 64. Another pickup member 97, similar to the member 94, is associated with the guide 74.

For convenience in initiating oscillation of the carrier about the axis P with a predetermined amplitude, a latch 98 (FIGS. 2 and 4) mounted to swing upon the standard 50, is arranged to hold the rearward shaft 44 at a 5° elevation and, upon swinging the latch away from the shaft, oscillation of the carrier is started.

When the illustrated apparatus is used to determine the dynamic unbalance of the body 12, each weight W is moved onto its storage pin 90 and the guideway 66 is set in its inoperative position, permitting the carrier to be rotated about its axis R by motors 102, 102, each of which is mounted to swing upon one of the standard 56, 50 so as to permit a drive wheel 104 on each motor to be brought into engagement with a peripheral rib 106 on the carrier. In response to dynamic unbalance of the body 12, when it is thus rotated with an initial velocity of approximately 30 r.p.m., the body and carrier oscillate, subject to a gravitational restoring moment, about the axis P under the control of the guideway 62 and guide 60. This oscillation is subject to the soft restraint of a damping fork 107 (FIGS. 2 and 5) which is mounted for movement into and out of operative relation to the guide 60 in a cylinder 108 which is mounted to pivot freely at 109 upon the member 63. Damping action of the fork 107 is derived from a double acting dash-pot device having a cylinder 110 pivoted to the member 63 and a piston 111 pivoted to the cylinder 108. A variable damping effect from the dash-pot may be obtained by any suitable means, such as a variable orifice in the piston or a valve controlled by-pass connecting the ends of the cylinder. The fork 107 may be moved between its inoperative position (FIG. 5) and its operative position by supplying fluid pressure to the appropriate end of the cylinder 108.

The amplitude of the oscillation of the carrier is registered by instrumentation including a pick-up 112 (FIG. 4) which is mounted for adjustment upon a bracket 113 into and out of operative relation to the rib 106 on the carrier. An adjusting screw 114 threaded into the pick-up is provided for setting the pick-up and a screw 116 threaded into the bracket 112 holds the pick-up fixedly upon the bracket.

In the usage of the illustrated apparatus for determining the moment of inertia of the body 12 about the axis R, the weights W, W remain upon the storage shafts 90, the guide 66 remains in its inoperative position, the damping fork 107 is set in its inoperative position, and another fork 118 (FIG. 5) is brought into operative relation to the guide 60 positively to prevent the latter from moving lengthwise of the guideway 62 in either direction from a position in which the axis R of the carrier is vertical. The fork 118 has a piston formed upon its outer end which is mounted to slide in a cylinder 119 fixed upon the member 63. Fluid pressure is to be supplied to either end of the cylinder by suitable connections (not shown) to move the fork into and hold it in operative relation to the guide 60 or to retract the fork from the guide, as when the other fork 107 is in use.

In the last-mentioned usage of the apparatus, the carrier is oscillated about the axis R subject to a restoring moment provided by two pairs of tensioned springs 120, 122 (FIGS. 1 and 2), the adjacent ends of each pair being connected to one of two lugs 124 which are fixed upon the carrier 10 at opposite sides thereof. The other ends of the spring 120, 122 are connected to brackets 126, 128, respectively, mounted upon the shield 41. The springs 120, 122 are thus arranged to bias the carrier in opposite directions about the axis R and, according to their "spring scale," effect an amplitude of oscillation of the carrier of about 5° with a period depending upon the weight distribution of the mass which is oscillated. To keep this period within the above-mentioned range of 2–5 seconds, and to vary the weight distribution of the carrier, for a purpose to be referred to below, cylindrical auxiliary weights (not shown) aggregating approximately 160 lbs. are installed upon the shafts 44 under one condition of oscillation about the axis R.

For convenience in initiating oscillation of the carrier about the axis R with the desired amplitude, a latch 130 (FIGS. 2 and 4) mounted to swing upon the standard 50 at 132, is arranged to cooperate with the side of the carrier to hold it about 5° to one side of its mid-position and to release the carrier upon being swung away therefrom. The period of oscillation of the carrier about the axis R is registered by instrumentation including pick-up members 134, 136, the latter being mounted upon the lower side of the rib 106 and the former being mounted on the bracket 113 for movement into and out of operative relation to the member 136. A screw 138 threaded into the pick-up member 134 is provided for adjusting the member and the latter is secured upon the bracket 113 by a screw 140 threaded into the bracket.

It is to be assumed that the carrier 10 will be built in perfect static and dynamic balance and that the moments of inertia of the auxiliary weights W about the axis P and of the other auxiliary weights (not shown) about the axis R are known.

The determination of the weight of the body 12 and the position of its center of gravity in a horizontal plane already having been described above, there will follow a description of the use of the illustrated apparatus and the practice of applicants' methods of determining the moment of inertia of the body about the axis R, the position of the center of gravity of the body along the axis R, the moments of inertia of the body with respect to the axes P and Y, and the dynamic unbalance of the body.

*Moment of Inertia About Axis R*

In the preparation of the apparatus for this procedure, the fork 118 is brought into operative relation to the guide 60 and the pick-up member 134 is set in its operative position. All other restraints for controlling the movement of the carrier, as well as all other adjustable pick-up members, are not used or are set in their inoperative positions, if necessary. Both sets of springs 120, 122 are installed and the carrier is displaced, by being rotated about the axis R, to allow the latch 130 to be swung into its operative position in engagement with the carrier. Upon moving the latch away from the carrier (without the body 12), the period of oscillation ($P_{R1}$) of the carrier alone is ascertained from the instrumentation including the pick-up member 134. The auxiliary weights (not shown), of about 160 pounds total weight, are next assembled upon the shafts 44 and the above procedure is repeated to determine the period of oscillation ($P_{R2}$) of the carrier with the auxiliary weights. Finally, the auxiliary weights are removed from the carrier and the body 12 is mounted thereon in the manner described above. The carrier and body 12 are now oscillated and their period of oscillation ($P_{R3}$) is ascertained. From the above periods of oscillation and the already known moment of inertia ($I_{WR}$) of the auxiliary weights about the axis R, the moment of inertia of the body ($I_{BR}$) with respect to the axis R is determined from the following formula:

$$I_{BR} = \frac{P_{R3}^2 - P_{R1}^2}{P_{R2}^2 - P_{R1}^2} \times I_{WR}$$

The derivation of this formula is as follows:

Let $P_{R1}$=oscillation period of carrier 10 (sec.)
$P_{R2}$=oscillation period of carrier with auxiliary weights, (sec.)
$P_{R3}$=oscillation period of carrier and body 12 (sec.)
$I_{BR}$=moment of inertia of body about axis R (slug ft.²)
$I_{CR}$=moment of inertia of carrier about axis R (slug ft.²)
$I_{WR}$=moment of inertia of aux. weights about axis R slug ft.²)
$k_R$=effective spring scale of springs 120, 122 (lb. ft. rad.⁻¹)
$K_R$=correction factor for damping, amplitude of oscillation, etc.

The period of oscillation (P) of a mass about an axis is represented by the expression $$P = 2\pi \sqrt{\frac{I}{M}} \text{ in which}$$

$I$=moment of inertia of the mass about the axis, and
$M$=restoring moment

For a period of oscillation about an axis, such as axis R in the illustrated apparatus, the above expression becomes $$P = 2\pi K_R \sqrt{\frac{I}{k_R}}$$

from which the three above stated periods $P_{R1}$, $P_{R2}$ and $P_{R3}$ can be written as:

(1) $\quad P_{R1}^2 = (2\pi K_R)^2 \frac{I_{CR}}{k_R}$ (2) $\quad P_{R2}^2 = (2\pi K_R)^2 \frac{I_{CR}+I_{WR}}{k_R}$ (3) $\quad P_{R3}^2 = (2\pi K_R)^2 \frac{I_{CR}+I_{BR}}{k_R}$ Subtracting (1) from (2):

(4) $\quad P_{R2}^2 - P_{R1}^2 = (2\pi K_R)^2 \frac{I_{WR}}{k_R}$

Subtracting (1) from (3):

(5) $\quad P_{R3}^2 - P_{R1}^2 = (2\pi K_R)^2 \frac{I_{BR}}{k_R}$

Dividing (5) by (4) and rearranging:

(6) $\quad I_{BR} = \frac{P_{R3}^2 - P_{R1}^2}{P_{R2}^2 - P_{R1}^2} I_{WR}$

Thus, by the foregoing simultaneous solution for the moment of inertia of the body, the only data to be obtained (the moment of inertia of the auxiliary weights being known) are the three periods of oscillation, since all other factors, which will have remained constant throughout the procedure, are eliminated by cancellation.

*Moment of Inertia About Axes P and Y and Position of the Center of Gravity Along Axis R*

In the preparation of the apparatus for this procedure, the above-mentioned pick-up member 134 and fork 118 are set in their inoperative positions and the guideway 66, carrying the pick-up member 95, is set in its operative position, the guideway and pick-up member then being in operative relation to the guide 64 and pick-up member 96, respectively. All other restraints for controlling the movement of the carrier, as well as all other pick-up members, are not used or are set in their inoperative positions, if necessary. The above-mentioned auxiliary weights are removed from the carrier and the weights W, W which have been stored upon the shafts 90, are slid onto the shafts 44 on the axis P, each weight W being set and locked in its lower position by inserting the pin 80 into the bracket 42. The carrier without the body 12 and with the weights W, W down, is swung about the axis P far enough to permit the latch 98 to support the rearward shaft 44. Upon moving the latch away from the shaft, the carrier oscillates subject to a gravitational restoring moment, and the period of oscillation of the carrier with the weights W, W down ($P_1$) is ascertained. Next, by turning the worms 86, 86 the weights W, W are elevated to their upper positions and held therein by inserting the pins 88, 88 into the brackets 42. The last-mentioned procedure is now repeated and the period of oscillation of the carrier alone with the weights W, W up ($P_2$) is ascertained. Next, the body 12 is installed, as above described, upon the carrier, and the periods of oscillation of the carrier and body are ascertained, once with the weights down ($P_3$) and again with the weights up ($P_4$).

The moment of inertia of the body about the axis P ($I_{BP}$) and the distance of the center of gravity of the body from the axis P along the axis R (D) may now be determined by evaluating the following formulae, the terms of which not mentioned above being known constants:

$$I_{BP} = \left(\frac{P_4^2 P_3^2}{P_4^2 - P_3^2} - \frac{P_2^2 P_1^2}{P_2^2 - P_1^2}\right) \frac{2mgl}{k}$$

$$D = \left(\frac{P_4^2 + P_3^2}{P_4^2 - P_3^2} - \frac{P_2^2 + P_1^2}{P_2^2 - P_1^2}\right) \frac{ml}{M_B}$$

It is evident that by repeating the above procedure, after having turned the carrier to bring the guide 74 into operative relation with the guideway 66 and shifting the weights W, W onto the set of brackets 42 on the axis Y, the moment of inertia of the body with respect to the axis Y can be obtained in the same manner.

The derivation of the last-mentioned formulae is as follows:

Let $P_1$=oscillation period of carrier 10 with weights W, W down (sec.)
$P_2$=oscillation period of carrier with weights up (sec.)
$P_3$=oscillation period of carrier and body with weights down (sec.)
$P_4$=oscillation period of carrier and body with weights up (sec.)
$I_{CP}$=moment of inertia of carrier about axis P (slug ft.²)
$I_{BP}$=moment of inertia of body about axis P (slug ft.²)
$I_{WP}$=moment of inertia of weights about axis P (slug ft.²)
$I_B$=moment of inertia of body about its center of gravity (slug ft.²)
$M_{CP}$=restoring moment of carrier about axis P (lb. ft. rad.⁻¹)
$M_{BP}$=restoring moment of body about axis P (lb. ft. rad.⁻¹)
$K$=correction factor for damping and amplitude of oscillation
$D$=distance of C. G. of body from axis P (ft.)
$m$=mass of weights (slug)
$M_B$=mass of body (slug)
$g$=acceleration of gravity
$l$=distance of C. G. of $m$ from axis P (ft.)

The period of oscillation (P) of a compound pendulum is represented by the following expression:

$$P = 2\pi k \sqrt{\frac{I}{M}}$$

in which, $I$=moment of inertia of the pendulum,
$M$=restoring moment, and
$K$=correction factor for damping and the amplitude of oscillation.

For the above-stated periods of oscillation about axis

P, in the illustrated apparatus, the above expression becomes:

(1) $$P_1^2 = (2\pi K)^2 \frac{I_{CP} + I_{WP}}{M_{CP} + mgl}$$

(2) $$P_2^2 = (2\pi K)^2 \frac{I_{CP} + I_{WP}}{M_{CP} - mgl}$$

(3) $$P_3^2 = (2\pi K)^2 \frac{I_{CP} + I_{BP} + I_{WP}}{M_{CP} + M_{BP} + mgl}$$

(4) $$P_4^2 = (2\pi K)^2 \frac{I_{CP} + I_{BP} + I_{WP}}{M_{CP} + M_{BP} - mgl}$$

Rearranging (1) and (2), letting $k = (2\pi K)^2$ (1a) $$I_{CP} + I_{WP} = \frac{P_1^2}{k}(M_{CP} + mgl)$$

(2a) $$I_{CP} + I_{WP} = \frac{P_2^2}{k}(M_{CP} - mgl)$$

Subtracting (2a) from (1a), and solving for $M_{CP}$ $$0 = \frac{1}{k}(P_1^2 M_{CP} + P_1^2 mgl - P_2^2 M_{CP} + P_2^2 mgl)$$

$$M_{CP}(P_1^2 - P_2^2) + mgl(P_1^2 + P_2^2) = 0$$

(5) $$M_{CP} = \frac{P_1^2 + P_2^2}{P_2^2 - P_1^2} mgl$$

Rearranging (1) and (2), letting $k = (2\pi K)^2$ (1b) $$M_{CP} + mgl = \frac{k}{P_1^2}(I_{CP} + I_{WP})$$

(2b) $$M_{CP} - mgl = \frac{k}{P_2^2}(I_{CP} + I_{WP})$$

Subtracting (2b) from (1b) and solving for $I_{CP}$ $$2mgl = (I_{CP} + I_{WP})\left(\frac{k}{P_1^2} - \frac{k}{P_2^2}\right)$$

$$I_{CP} + I_{WP} = \frac{2mgl}{\frac{k}{P_1^2} - \frac{k}{P_2^2}}$$

(6) $$I_{CP} = \frac{P_1^2 P_2^2 (2mgl)}{k(P_2^2 - P_1^2)} - I_{WP}$$

Rearranging (3) and (4), letting $k = (2\pi K)^2$ (3a) $$I_{CP} + I_{BP} + I_{WP} = \frac{P_3^2}{k}(M_{CP} + M_{BP} + mgl)$$

(4a) $$I_{CP} + I_{BP} + I_{WP} = \frac{P_4^2}{k}(M_{CP} + M_{BP} - mgl)$$

Subtracting (4a) from (3a) and solving for $M_{BP}$ $$0 = \frac{1}{k}(M_{CP} + M_{BP})(P_3^2 - P_4^2) + mgl(P_3^2 + P_4^2)$$

$$M_{CP} + M_{BP} = \frac{P_3^2 + P_4^2}{P_4^2 - P_3^2} mgl$$

(7) $$M_{BP} = \frac{P_3^2 + P_4^2}{P_4^2 - P_3^2} mgl - M_{CP}$$

Rearranging (3) and (4), letting $k = (2\pi K)^2$ (3b) $$M_{CP} + M_{BP} + mgl = \frac{k}{P_3^2}(I_{CP} + I_{BP} + I_{WP})$$

(4b) $$M_{CP} + M_{BP} - mgl = \frac{k}{P_4^2}(I_{CP} + I_{BP} + I_{WP})$$

Subtracting (4b) from (3b) and solving for $I_{BP}$ $$2mgl = (I_{CP} + I_{BP} + I_{WP})\left(\frac{k}{P_3^2} - \frac{k}{P_4^2}\right)$$

$$I_{CP} + I_{BP} + I_{WP} = \frac{2mgl}{k}\left(\frac{P_3^2 P_4^2}{P_4^2 - P_3^2}\right)$$

(8) $$I_{BP} = \frac{2mgl}{k}\left(\frac{P_3^2 P_4^2}{P_4^2 - P_3^2}\right) - I_{CP} - I_{WP}$$

Combining (5) and (7)

$$M_{BP} = \frac{P_3^2 + P_4^2}{P_4^2 - P_3^2} mgl - \frac{P_1^2 + P_2^2}{P_2^2 - P_1^2} mgl$$

(9) $$M_{BP} = mgl\left(\frac{P_4^2 + P_3^2}{P_4^2 - P_3^2} - \frac{P_2^2 + P_1^2}{P_2^2 - P_1^2}\right)$$

Combining (6) and (8)

$$I_{BP} = \frac{2mgl}{k}\left(\frac{P_3^2 P_4^2}{P_4^2 - P_3^2}\right) - \frac{2mgl}{k}\left(\frac{P_1^2 P_2^2}{P_2^2 - P_1^2}\right) + I_W - I_{WP}$$

(10) $$I_{BP} = \frac{2mgl}{k}\left(\frac{P_4^2 P_3^2}{P_4^2 - P_3^2} - \frac{P_2^2 P_1^2}{P_2^2 - P_1^2}\right)$$

From statics, $$D = \frac{M_{BP}}{M_B g}$$

$$= \frac{ml}{M_B}\left(\frac{P_4^2 + P_3^2}{P_4^2 - P_3^2} - \frac{P_2^2 + P_1^2}{P_2^2 - P_1^2}\right)$$

From the moment of inertia transfer rule, $$I_B = I_{BP} - M_B D^2$$

These simultaneous solutions for the moment of inertia of the body about the axis P and the distance of its center of gravity from this axis permit these quantities to be evaluated from the same data pertaining only to the four above-noted periods of oscillation (the masses of the weights W, W and the distance of their center of gravity from the pivot axis being a known constant of the apparatus).

*Dynamic Unbalance*

In the preparation of the apparatus for this procedure, the guideway 66 is set in its operative position and both forks 107, 118 are retracted from the guide 60 into their inoperative positions whereby oscillation of the carrier with the body thereon is permitted about the axis P. With the weights W, W stored on the shafts 90, the carrier and body are oscillated about the axis P and the period of oscillation $P_{P5}$ is ascertained.

The carrier is next turned 90° to bring the guide 74 into operative relation to the guideway 66. The carrier and body are again oscillated, about the axis Y, and the period of oscillation $P_{Y5}$ is ascertained. From $P_{P5}$ and $P_{Y5}$ the average period $P_5$ is found in order to compensate for variations in the symmetry or homogeneity of the body.

The foregoing procedure is repeated with the weights W, W installed upon the brackets 42 and the periods of oscillation $P_{P3}$, $P_{P4}$ of the carrier, body and weights about the axis P with the weights down and up, respectively, are ascertained. Similarly, the corresponding oscillation periods $P_{Y3}$, $P_{Y4}$ of the carrier, body and weights about the axis Y are also found.

Using these observed periods, the moments of inertia of the carrier and body $I_{CBP}$, $I_{CBY}$ about the P and Y axes, respectively, are determined from the following formulae having simultaneous algebraic derivations similar to those given above:

$$I_{CBP} = \left(\frac{P_{P4}^2 + P_{P3}^2}{P_{P4}^2 - P_{P3}^2}\right)\left(\frac{mgl}{(2\pi k)^2}\right) P_{P5}^2$$

$$I_{CBY} = \left(\frac{P_{Y4}^2 + P_{Y3}^2}{P_{Y4}^2 - P_{Y3}^2}\right)\left(\frac{mgl}{(2\pi k)^2}\right) P_{Y5}^2$$

From $I_{CBP}$ and $I_{CBY}$ the average moment of inertia of the carrier and body about a horizontal axis $I_{CBH}$ is found.

The guideway 66 is now retracted into its inoperative position and the weights W, W are returned to the storage shafts 90 preparatory to rotating the carrier and body about the axis R in response to which the carrier and body will oscillate, owing to dynamic unbalance of the body, under the control of the guide 60 and guideway 62. The damping fork 107 is brought into operative relation to the guide 60.

The motors 102 are now set to bring their drive wheels 104 into engagement with the rib 106 on the carrier, and the carrier and body are rotated to a speed somewhat greater than twice their natural frequency $w_n$ which may be determined either experimentally or from the following expression employing the average period of oscillation $P_5$ obtained above:

$$w_n = \frac{60}{P_5} \text{ (rev./min.)}$$

The motors are next returned to their inoperative positions, and, as the rotational speed of the carrier and body falls and passes through $2w_n$, the amplitude of their oscillation A, speed w, and phase are ascertained. From these quantities the maximum product of inertia $H_{CR}$ about the axis R is determined from the following equation:

$$H_{CR} = \frac{A}{D} I_{CBH} \left( 1 - \left( \frac{w_n}{w} \right)^2 \right)$$

and the dynamic unbalance moment $U_M$, at any speed $w_1$, is found from the following expression $$U_M = H_{CR} \, w_1^2$$

There follows a list of the terms (with their units) which pertain to the last described procedure:

$P_{P5}$=oscillation period of carrier and body about axis P (sec.)
$P_{Y5}$=oscillation period of carrier and body about axis Y (sec.)
$P_{P3}$=oscillation period of carrier and body about axis P with weights W down (sec.)
$P_{P4}$=oscillation period of carrier and body about axis P with weights W up (sec.)
$P_{Y3}$=oscillation period of carrier and body about axis Y with weights down (sec.)
$P_{Y4}$=oscillation period of carrier and body about axis Y with weights up (sec.)
$I_{CBP}$=moment of inertia of carrier and body about axis Y (slug ft.$^2$)
$I_{CBY}$=moment of inertia of carrier and body about axis Y (slug ft.$^2$)
$I_{CBH}$=average moment of inertia of carrier and body about horizontal axis (slug ft.$^2$)
A=amplitude of oscillation of carrier and body (in.)
D=distance from axis of oscillation at which amplitude A is measured (in.)
$w_n$=natural frequency of carrier and body (rev./min.)
w=rotational speed when A is ascertained
$H_{CR}$=max. product of inertia about axis R
$U_M$=dynamic unbalance moment
m=mass of weight (slug)
l=distance of C.G. of m from axis P (ft.)
g=acceleration of gravity
K=correction factor for damping and amplitude of oscillation

Having thus described our invention, what we claim as new and desire to secure by Letters Patent of the United States is:

1. That method of testing a body to determine its moment of inertia about an axis thereof which consists in providing a carrier for the body mounted to oscillate about an axis coincident with that of the body mounted upon the carrier, oscillating the carrier without and with the body mounted thereon, making predetermined changes in the weight distribution of the carrier to vary the period of oscillation, and ascertaining under selected weight distributions of the carrier the periods of oscillation of the carrier without the body and with the body mounted thereon.

2. That method of testing a body to determine its moment of inertia about different axes thereof which consists in providing a carrier mounted to oscillate about an axis coincident with each of said axes of the body mounted upon the carrier, oscillating the carrier about each of said axes without and with the body mounted thereon, making predetermined changes in the weight distribution of the carrier to vary the period of oscillation, and ascertaining for selected weight distributions of the carrier the periods of oscillation about each of said axes of the carrier without the body and with the body mounted thereon.

3. That method of testing a body to determine its moment of inertia about an axis thereof which consists in providing a carrier for the body mounted to oscillate about an axis coincident with that of the body mounted upon the carrier, oscillating the carrier without and with the body mounted thereon, making predetermined changes in the weight distribution of the carrier transversely of or in orientation about said axis to vary the period of oscillation, and ascertaining under selected conditions of weight distribution of the carrier periods of oscillation of the carrier without the body and with the body mounted thereon.

4. That method of testing a body to determine its moments of inertia about vertical and horizontal axes which consists in providing a carrier for the body mounted to oscillate about axes coincident with each of said vertical and horizontal axes, oscillating the carrier without and with the body mounted thereon, making predetermined changes in the weight distribution of the carrier transversely of the vertical axis to vary the period of oscillation about the vertical axis, determining periods of oscillation about the vertical axis of the carrier without the body and with the body mounted thereon under selected conditions of said weight distribution, making predetermined changes in the weight distribution of the carrier in orientation about the horizontal axis, and determining periods of oscillation about the horizontal axis of the carrier without the body and with the body mounted thereon under selected conditions of said last-mentioned weight distribution.

5. That method of testing a body to determine its moments of inertia with reference to two axes which consists in providing a carrier for the body mounted to oscillate about axes coincident with each of said two axes of the body mounted upon the carrier, ascertaining the period of oscillation about one of said axes of said carrier with the body mounted thereon and the periods of oscillation of said carrier with and without an auxiliary weight of known moment of inertia with reference to said one axis, and ascertaining the periods of oscillation of said carrier with the body mounted thereon about the other axis subject to each of two different restoring moments and the periods of oscillation of said carrier without the body about said other axis subject to each of said restoring moments.

6. That method of testing a body to determine its moments of inertia with reference to vertical and horizontal axes which consists in providing a carrier for a body mounted to oscillate about a vertical axis subject to a predetermined restoring moment and about a horizontal axis subject to a variable gravitational restoring moment, said axis of oscillation of said carrier being coincident with the said vertical and horizontal axes of the body mounted upon the carrier, ascertaining the period of oscillation about said vertical axis of said carrier with the body mounted thereon and the periods of oscillation of said carrier about said vertical axis with and without an auxiliary weight of known moment of inertia, and ascertaining the periods of oscillation of said carrier with the body mounted thereon about said horizontal axis subject to each of two different restoring moments and the periods of oscillation of said carrier without the body about said horizontal axis subject to each of said restoring moments.

7. That method of testing a body to determine its moment of inertia which consists in providing a carrier mounted to oscillate freely about an axis subject to a predetermined restoring moment, said carrier being adapted to hold said body and an auxiliary weight of a known moment of inertia, oscillating said carrier alone and ascertaining its period of oscillation, oscillating said carrier with said auxiliary weight attached thereto and ascertaining their period of oscillation, removing said auxiliary weight from and mounting said body upon said carrier, and oscillating said carrier and said body and ascertaining their period of oscillation.

8. That method of testing a body to determine its moment of inertia and the position of its center of gravity which consists in providing a carrier mounted to oscillate freely about a horizontal axis subject to a gravitational restoring moment, said carrier having an auxiliary weight thereon movable between lower and upper diametrically opposite positions equidistant from said axis thereby to vary said restoring moment without changing the moment of inertia of the carrier and weight, oscillating said carrier about said axis with said auxiliary weght in its lower and upper positions and ascertaining the period of oscillation for each condition, mounting said body upon said carrier, and oscillating said carrier and body about said axis and ascertaining the period of oscillation of said carrier and body with said weight in each of said positions.

9. In an apparatus of the class described, a work carrier, a base upon which said carrier is mounted in stable equilibrium for rotation in any direction about a point above the center of gravity of said carrier, guiding means on said carrier and base for restricting movement of said carrier except about an axis perpendicular to an axis of said carrier intersecting its center of gravity and said point, and a weight mounted upon said carrier for movement between positions at opposite sides of and equidistant from said first-mentioned axis.

10. In an apparatus of the class described, a work carrier, a base upon which said carrier is mounted in stable equilibrium for rotation in any direction about a point above the center of gravity of said carrier, spaced guides mounted upon said carrier and lying in a common plane including an axis of said carrier passing through its center of gravity and said point, guideways on said base arranged to co-operate with said guides to restrict said carrier from movement except about a second axis perpendicular to said plane at said point, and weights mounted upon said carrier opposite to each other, each weight being movable into each of two opposite positions which are equidistant from said second axis.

11. In an apparatus of the class described, a work carrier, a base upon which said carrier is mounted in stable equilibrium for rotation in any direction about a point above the center of gravity of said carrier, a guide fixed upon said carrier at an axis thereof passing through its center of gravity and said point, a guideway on said base co-operating with said guide to permit movement of said carrier about a second axis perpendicular to the said first-mentioned axis at said point, an auxiliary guide on said carrier disposed in a plane intersecting said first-mentioned axis and perpendicular to said second axis, and an auxiliary guideway co-operating with said auxiliary guide for preventing rotation of said carrier about said first-mentioned axis.

12. In an apparatus of the class described, a work carrier, a base upon which said carrier is mounted freely to rotate in stable equilibrium in any direction about a point above its center of gravity, a guide fixed upon said carrier at an axis thereof including said point and center of gravity, a guideway on said base arranged to co-operate with said guide to permit movement of said carrier about a second axis perpendicular to the first-mentioned axis at said point, auxiliary guides on said carrier disposed in mutually perpendicular planes intersecting the said first-mentioned axis, and an auxiliary guideway on said base with which said auxiliary guides are selectively engageable and co-operate to prevent rotation of said carrier about said first-mentioned axis.

13. In an apparatus of the class described, a work carrier having below its center of gravity a spherical bearing surface the center of curvature of which is above said center of gravity, a base engaged by said bearing surface for supporting said carrier for rotation about a radius of its said surface including its center of gravity as an axis and for tilting movement in any direction about said center of curvature subject to a gravitational restoring moment, and guiding means on said carrier and base for restricting said tilting movement to rotation about a second axis perpendicular to the first-mentioned axis at said center of curvature whereby said carrier is permitted to oscillate about said second axis in response to dynamic unbalance of a work piece on said carrier when said carrier with the work piece thereon are rotated about said first-mentioned axis.

14. In an apparatus of the class described, a work carrier having below its center of gravity a spherical bearing surface the center of curvature of which is above said center of gravity, a base engaged by said bearing surface for supporting said carrier for rotation about a radius of its said surface including its center of gravity as an axis and for tilting movement in any direction about said center of curvature subject to a gravitational restoring moment, guiding means on said carrier and base for restricting said tilting movement to rotation about a second axis perpendicular to the first-mentioned axis at said center of curvature whereby said carrier is permitted to oscillate about said second axis in response to dynamic unbalance of a work piece on said carrier when said carrier with the work piece thereon are rotated about said first-mentioned axis, and means for damping the oscillatory movement of said carrier.

15. In an apparatus of the class described, a work carrier having below its center of gravity a spherical bearing surface the center of curvature of which is above said center of gravity, a base engaged by said bearing surface for supporting said carrier for rotation about a radius of its said surface including its center of gravity as an axis and for tilting movement in any direction about said center of curvature, guiding means on said carrier and base for restricting said tilting movement to rotation about a second axis perpendicular to the said first-mentioned axis at said center of curvature, and means on said base cooperating with said carrier to prevent said tilting movement whereby movement of said carrier is limited to rotation about its first-mentioned axis.

16. In an apparatus of the class described, a work carrier having below its center of gravity a spherical bearing surface the center of curvature of which is above said center of gravity, a base engaged by said bearing surface for supporting said carrier for rotation about a radius of its said surface including its center of gravity as an axis and for tilting movement in any direction about said center of curvature, guiding means on said carrier and base for restricting said tilting movement to rotation about a second axis perpendicular to the first-mentioned axis at said center of curvature, and stop means mounted upon said base for movement into operative relation to said carrier to prevent tilting movement thereof whereby movement of said carrier is limited to rotation about its said first-mentioned axis.

17. In an apparatus of the class described, a work carrier having upon the bottom thereof a spherical bearing surface, a base engaged by said bearing surface for supporting said carrier for free rotative movement in any direction about the center of curvature of said surface, guiding means on said carrier and base for restricting movement of said carrier to rotation about a vertical axis intersecting said center of curvature, and means for biasing said carrier about said axis in opposite directions toward a neutral position whereby said carrier is caused to oscillate upon being released from a position at either side of said neutral position.

18. In an apparatus of the class described, a work carrier having at the bottom thereof a bearing surface in the form of a segment of a sphere, a base engaged by said bearing surface for supporting said carrier for universal movement about the center of curvature of said bearing surface, a guide fixed upon the bottom of said carrier, a guideway on said base cooperating with said guide to limit movement of said guide to movement in a plane including said center of curvature and parallel to said guideway, stop means on said base for restraining said guide against movement lengthwise of said guideway, and means connecting said base and carrier for biasing said carrier in opposite directions into a neutral position whereby said carrier is caused to oscillate upon being released from a position at either side of said neutral position.

19. In an apparatus of the class described, a work carrier having below its center of gravity a spherical bearing surface the center of curvature of which is above said center of gravity, a base having a spherical support on which said carrier is mounted for universal rotative movement, guiding means on said carrier and base for limiting movement of said carrier to rotation about a vertical axis, and means for yieldingly resisting such movement of said carrier in either direction from a neutral position whereby said carrier is caused to oscillate upon being released from a position at either side of said neutral position.

20. In an apparatus of the class described, a work carrier having below its center of gravity a spherical bearing surface the center of curvature of which is above said center of gravity, a base having a spherical support on which said carrier is mounted for universal rotative movement, guiding means comprising a guide on said carrier for limiting movement of said carrier to rotation about a radius of said surface intersecting said center of gravity as an axis, means for yieldingly resisting movement of said carrier from a neutral position in either direction about said axis whereby said carrier is caused to oscillate on said base upon being released from a position at either side of said neutral position, and a weight detachably mounted upon said carrier at a predetermined distance from its said axis.

21. In an apparatus of the class described, a work carrier having below its center of gravity a spherical bearing surface the center of curvature of which is above and lies upon an axis intersecting said center of gravity, a base having a spherical support on which said carrier is mounted for universal rotative movement, guiding means comprising a guide on said carrier for limiting movement of said carrier to rotation about said axis, means for yieldingly resisting movement of said carrier from a neutral position in either direction about said axis whereby said carrier is caused to oscillate on said base upon being released from a position at either side of said neutral position, and means for detachably mounting weights of equal mass oppositely to each other upon said carrier equidistant from said axis.

References Cited in the file of this patent

UNITED STATES PATENTS

| | | |
|---|---|---|
| 1,437,798 | Flanders | Dec. 5, 1922 |
| 1,490,109 | Hort | Apr. 15, 1924 |
| 2,349,736 | Knoebel et al. | May 23, 1944 |
| 2,360,706 | Moses | Oct. 17, 1944 |
| 2,432,022 | Lawrie | Dec. 2, 1947 |
| 2,439,035 | Bidwell et al. | Apr. 6, 1948 |
| 2,668,443 | Welch | Feb. 9, 1954 |
| 2,935,876 | Lannen | May 10, 1960 |